United States Patent [19]

Pooley et al.

[11] Patent Number: 4,822,413

[45] Date of Patent: Apr. 18, 1989

[54] EXTRACTION OF METAL VALUES FROM ORES OR CONCENTRATES

[75] Inventors: Frederick D. Pooley, Cardiff, Wales; Martin T. Errington, Cleveland, England

[73] Assignee: Davy McKee (Stockton) Limited, Cleveland, England

[21] Appl. No.: 58,607

[22] Filed: Jun. 4, 1987

Related U.S. Application Data

[63] Continuation-in-part of Ser. No. 839,094, Mar. 13, 1986, abandoned.

[51] Int. Cl.$^4$ .............................................. C22B 11/04
[52] U.S. Cl. ........................................ 75/118 R; 75/2; 75/101 R; 75/115; 75/105; 423/29; 423/27; 423/30; 423/31; 423/41; 423/45; 423/DIG. 17
[58] Field of Search ............. 75/2, 101 R, 115, 118 R, 75/105; 423/29, 27, 30, 31, 41, 45, DIG. 17

[56] References Cited

U.S. PATENT DOCUMENTS

| | | | |
|---|---|---|---|
| 2,829,964 | 4/1958 | Zimmerley et al. | 423/DIG. 17 |
| 3,347,661 | 10/1967 | Mayling | 423/DIG. 17 |
| 3,856,913 | 12/1974 | McElroy et al. | 423/27 |
| 4,497,778 | 2/1985 | Pooley | 423/27 |
| 4,571,387 | 2/1986 | Bruynesteyn et al. | 423/DIG. 17 |

FOREIGN PATENT DOCUMENTS

| | | |
|---|---|---|
| 757602 | 4/1967 | Canada . |
| 869470 | 4/1971 | Canada . |
| 1018774 | 10/1977 | Canada . |
| 1409486 | 10/1975 | United Kingdom . |
| 2097369 | 11/1982 | United Kingdom . |

OTHER PUBLICATIONS

Tuovinen, O. H., and Kelly, D. P., Use of Micro-Organisms for the Recovery of Metals "The Metals Society", *International Metallurigical Reviews*, Review 179 pp. 21–31, vol. 19 (1974).

Livesy-Goldblatt et al, Conference Bacterial Leading GBF Monograph Series No. (1977).

Lawrence et al, "Biological Preoxidation of Pyrite Gold Concentrate", presented at Session on Frontier Technology in Mineral Processing–Feb. 24–28, 1985 Annual Meeting.

Marchant, "Commercial Piloting and the Economic Feasibility of Plant Scale Continuous Biological Tank Leaching at Equity Silver Mines Ltd.", at Biohydrometallurgy Conference held in Vancouver, British Columbia, Aug. 1985.

*Primary Examiner*—Robert L. Stoll
*Attorney, Agent, or Firm*—Bernard Rothwell & Brown

[57] ABSTRACT

A process is described for leaching ores or concentrates containing one or more metallic sulphides with a circulating liquor so as to solubilize desired metal values therefrom, if said metal values are capable of dissolution in an acidic ferric sulphate solution (e.g. copper), or so as to render the desired metal values (e.g. gold) more accessible to subsequent processing, in each case by effecting metallic sulphide dissolution from the ore or concentrate. In this process the ore or concentrate, for example a gold ore, is leached in a leach stage using an acidic leaching medium formed by mixing recycled liquor with a make-up stream containing bacterially generated ferric ions and sulphate ions which is produced in a generator (a) which is external to the circulation path of the liquor between the leach stage and a separation stage, (b) which contains a colony of suitable bacteria, such as *Thiobacillus ferro-oxidans*, and (c) which is fed, as necessary, with a pyritic material, water, nutrients, sulphuric acid and an oxygen-containing gas (e.g. air). As the presence of live bacteria in the leach state is not essential to operation, the process can be used for leaching arsenopyritic and similar ores and with a recycle stream containing high levels of arsenic or other impurity which is potentially deleterious to bacterial viability. A mixture of leached solids and liquor is passed from the leach stage to the separation stage, which is included in the path of the circulating liquor where leached solids are separated from a ferrous sulphate-containing liquor. The leached solids can be treated for recovery of metal values (e.g. gold), if the metal values are not leached in the leach stage. Alternatively, if the desired metal values (e.g. copper) appear in the liquor, the leached solids are discarded and the liquor is subjected to metal recovery, e.g. cementation, before recycle.

9 Claims, 1 Drawing Sheet

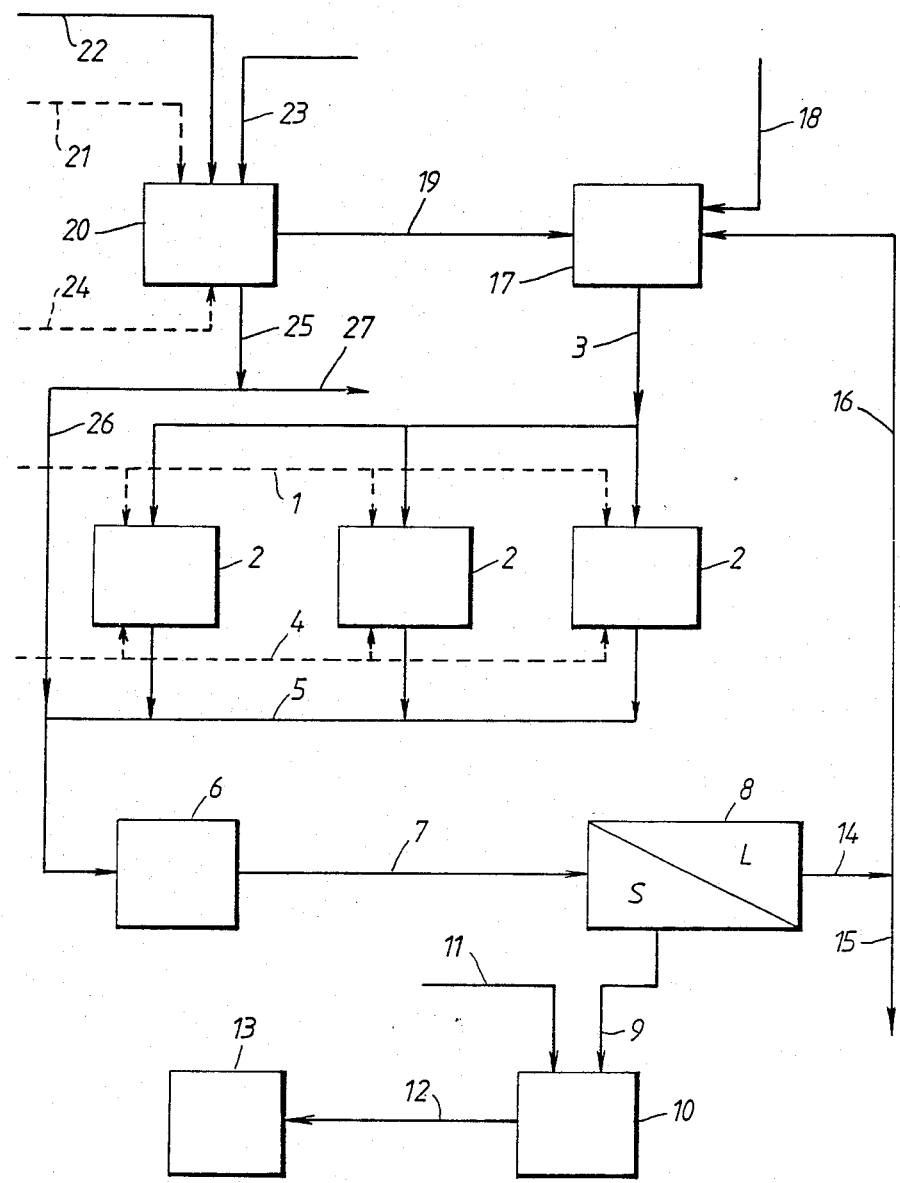

EXTRACTION OF METAL VALUES FROM ORES OR CONCENTRATES

This is a continuation-in-part of application Ser. No. 839,094 filed Mar. 13, 1986 now abandoned.

This invention relates to a process for extracting metal values from an ore or concentrate containing one or more metallic sulphides, more particularly to a process for extracting metal values from such ores or concentrates using a solution containing bacterially generated ferric ions.

The chemical oxidation of ores using sulphuric acid and ferric ions generated from ferrous salts using bacteria, such as *Thiobacillus ferro-oxidans*, has been described in numerous publications. For example, the use of such bacteria for leaching of minerals was reviewed by O. H. Tuovinen and D. P. Kelly in "International Metallurgical Reviews" (1974), Vol. 19, pages 21 to 31.

U.S. Pat. No. 2,829,964 teaches a cyclic process in which a metalliferous ore, concentrate or intermediate product of milling is leached with a ferric sulphate/sulphuric acid lixiviant solution containing *Thiobacillus ferro-oxidans*, metal is then removed from the lixiviant solution, and then the spent lixiviant is conducted to a regeneration stage in which it is aerated to promote conversion of ferrous sulphate to the ferric state before recycling the regenerated solution to the leaching stage. The use of such a process for recovery of copper from copper-bearing pyrite ores and from mixed oxide-sulphide copper ores, for treatment of molybdenite concentrates, for upgrading of low grade chromite ores, and for recovery of zinc from zinc sulphide ores is exemplified.

CA-A-No. 757602 also describes a cyclic process for bacteriological extraction of metals from sulphur-containing ores or concentrates using *Thiobacillus ferro-oxidans*. Prior to metal recovery some of the bacteria are separated from the liquor and are returned to the fermentation vessel in which leaching is carried out. Addition of $CO_2$ to the air used for aeration in such a process is suggested in CA-A-No. 869470.

Copper extraction by bacteriological methods is described in U.S. Pat. No. 3,856,913. According to this disclosure improved copper extraction results if silver is added to the leaching pulp when leaching ores and concentrates containing chalcopyrite.

Bacterial oxidation of ferrous sulphate produced as a byproduct in titanium dioxide manufacture is disclosed in GB-B-No. 1490486. *Thiobacillus ferro-oxidans* is recommended for use in this process.

Continuous bacterial oxidation of aqueous ferrous sulphate solution having a pH of at least 0.8 by passage through a vessel provided with inserts whose surfaces and the walls of the vessel are coated with a bacterial oxidising agent, such as *Thiobacillus ferro-oxidans* or *Ferrobacillus ferro-oxidans*, is taught by CA-A-No. 1018774. This process is known as the BACFOX process, further details of which can be found in a paper by E. Livesey-Goldblatt et al presented at the 1977 Conference on Bacterial Leaching and published in "Conference Bacterial Leaching GBF Monograph Series No. 4", published by Verlag Chemie: the title of this last-mentioned paper is "Pilot-plant bacterial film oxidation (BACFOX process) of recycled acidified uranium plant ferrous sulphate leach solution".

According to GB-A-No. 2097369 an improved recovery of metals is obtained in a bacterial leaching process if the sulphide-containing ore or concentrate is roasted to remove part of the sulphur present in the sulphide before being leached.

It is recognised in the art that, although cyanide leaching of some gold sulphide ores can result in recovery of about 97% of the gold content of the ore, other such ores yield only about 30% of the total gold content upon cyanide treatment, particularly when the gold is associated with arsenopyrite. Biological leaching using *Thiobacillus ferro-oxidans* has been proposed as one method of pretreatment of such gold ores in order to liberate the gold and other precious metals locked in sulphides, such as pyrite and arsenopyrite. For example, Richard W. Lawrence and J. David Gunn describe a process involving a conventional bioleach circuit in a paper "Biological Preoxidation of Pyrite Gold Concentrate" presented at the Session on Frontier Technology in Mineral Processing at the 1985 A.I.M.E. Annual Meeting in New York, N.Y. which took place Feb. 24–28, 1985. Similar work is described in a paper entitled "Commercial Piloting and the Economic Feasibility of Plant Scale Continuous Biological Tank Leaching at Equity Silver Mines Limited" by P. Brad Marchant presented at the Biohydrometallurgy Conference organised by C.I.M. that was held in Vancouver, British Columbia in August 1985.

In the cyclic leaching processes of the prior art the liquor is circulated between the leach stage and a separate regeneration zone in which the bacteria (e.g. *Thiobacillus ferro-oxidans*) are used in a role akin to that of a catalyst for regenerating ferric ions from ferrous ions, air being blown through the solution to promote this oxidation reaction. Because the residence time in the leach stage is long and the concentration of ferrous sulphate in the circulating liquid is low, a very large volume of lixiviant is required in order to sustain the process. This means that large tanks are necessary. Moreover in the event of interruption of plant operation it generally takes a considerable time to reestablish a sufficient level of bacterial activity to enable the process to operate efficiently. Hence there will usually be a considerable lag between restarting the plant and recommencement of the leaching activity while a sufficient concentration of active bacteria is reestablished.

When using the prior art cyclic leaching processes with ores or concentrates containing a high level of arsenic or other constituent of potential harm to bacterial viability, problems may arise due to build up of such constituent or constituents in the circulating liquor. Although the bacteria can be induced to develop through natural selection or adaptation somewhat increased tolerance towards constituents, such as arsenic, yet it may be necessary to operate with a relatively dilute liquor in order to prevent the level of arsenic or other constituent from building up in the circulating liquor to a value which is deleterious to bacterial activity. This means that the residence time in the leach stage must be correspondingly long, because a dilute liquor is being used, and that correspondingly large leach tanks must be used.

The present invention accordingly seeks to provide an improved bacterial leaching process in which any interruption of operation does not result in an inordinately long induction period before successful leaching can recommence. It further seeks to provide a more compact form of plant by reducing the volume of circulating lixiviant solution. In addition it seeks to provide an improved process for upgrading a gold-containing ore or concentrate. Yet again the invention seeks to provide an improved bacterial leaching process which can be used effectively upon ores or concentrates having high levels of arsenic or other impurities of potential harm to bacterial viability.

According to the present invention there is provided a process for the extraction of metal values from a solid material selected from an ore and a concentrate and containing one or more metallic sulphides using a leach liquor containing bacterially generated ferric ions in order to effect metallic sulphide dissolution, in which a circulating aqueous liquor is used which circulates between a leach stage, in which metallic sulphides in the solid material are leached therefrom by contact of the solid material in pulp form with the leach liquor, and a separation stage, in which leached solids are separated from aqueous liquor, and in which an aqueous solution containing bacterially generated ferric ions and sulphate ions is generated for use in the leach stage in a separate generator which is external to the circulation path of the circulating aqueous liquor and which contains a colony of bacteria capable of oxidising metallic sulphides. Preferably the aqueous solution containing bacterially generated ferric ions and sulphate ions is produced by supplying to the generator, as required, a pyritic material, water, nutrients, sulphuric acid, and an oxygen-containing gas.

The solid material can be, for example, an arsenopyritic ore or concentrate.

In some cases the desired metal values are capable of being solubilised in an acidic ferric sulphate solution, in which case the metal values are leachable metal values and are present in the solid material in metallic sulphide form. In this case the leached solids recovered from the separation stage are depleted in said leachable metal values and are generally discarded, whilst aqueous liquor recovered from the separation stage can be subjected to a metal recovery step in a metal recovery stage for recovery of leached metal values therefrom. Barren liquor from the metal recovery stage can then be recycled to the leach stage. A part of the circulating aqueous liquor is desirably discarded in dependence on the volume of aqueous solution supplied from the generator. In this way the water balance of the plant can be maintained. The leached solids can be taken away for disposal. An example of such a process is one in which the ore or concentrate is, for example, a copper ore, such as a copper-bearing pyrite, in which case the aqueous liquor from the separation step can be subjected to conventional copper recovery techniques, such as cementation, whilst the leached solids are discarded. The barren ferrous sulphate solution from the copper recovery stage, which is now depleted in dissolved copper values, can then be recycled to the leach stage, whilst sufficient thereof is discarded to compensate for solution supplied from the bacterial generator. In this way the water balance of the plant can be maintained. Typical ores or concentrates which can be treated in this way include copper-bearing pyrites, copper-containing mixed oxides and sulphides, and molybdenite-copper minerals.

Zinc-bearing sulphide materials, such as marmatitic ores or concentrates, can also be treated by the process of the invention. Again, cementation can be used for recovery of zinc from the pregnant aqueous liquor recovered from the separation stage.

The process of the invention can also be applied to leaching of cobalt, nickel, tin, and uranium from their ores.

In other cases, however, the desired metal values are not leached from the ore or concentrate by acidic ferric sulphate solution, for example precious metals such as gold. In this case the surrounding base metal sulphide matrix is broken down in the leaching step thus exposing the desired metal values, e.g. gold, and facilitating their recovery in a subsequent recovery step, such as conventional leaching. In an example of such a process the ore or concentrate is a gold-containing ore or concentrate and the leached solids recovered from the separation stage are treated for recovery of gold therefrom. Typically a conventional cyanide leaching process can be used in such a gold recovery step.

Other examples of processes in which the desired metal values are not leached by acidic ferric sulphate solution and remain in the leached solids include upgrading of low grade chromite ores or titanium bearing materials and recovery of high grade molybdenum disulphide from copper-containing $MoS_2$ concentrates.

The process of the invention is distinguished from the prior art cyclic bacterial leaching processes by providing for generation of all, or at least a significant proportion, of the ferric ions required in the leach stage in a separate generator which is external to the liquid lixiviant soution recycle loop.

The preferred bacterium is *Thiobacillus ferro-oxidans*.

In the generator bacterial leaching of pyrite takes place. Such leaching can be described as occurring according to the following equations:

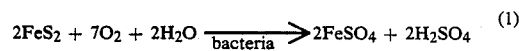

$$2FeS_2 + 7O_2 + 2H_2O \xrightarrow{bacteria} 2FeSO_4 + 2H_2SO_4 \quad (1)$$

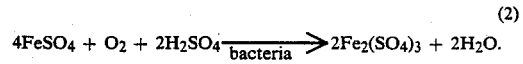

$$4FeSO_4 + O_2 + 2H_2SO_4 \xrightarrow{bacteria} 2Fe_2(SO_4)_3 + 2H_2O. \quad (2)$$

In addition chemical leaching may occur:

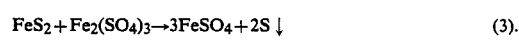

$$FeS_2 + Fe_2(SO_4)_3 \rightarrow 3FeSO_4 + 2S \downarrow \quad (3).$$

$$2S + 3O_2 + 2H_2O \rightarrow 2H_2SO_4 \quad (4).$$

The overall reaction can be expressed thus:

$$4FeS_2 + 15O_2 + 2H_2O \rightarrow 2Fe_2(SO_4)_3 + 2H_2SO_4 \quad (5).$$

For arsenopyrite the above equations may be modified to:

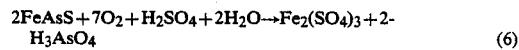

$$2FeAsS + 7O_2 + H_2SO_4 + 2H_2O \rightarrow Fe_2(SO_4)_3 + 2H_3AsO_4 \quad (6)$$

In addition:

$$2H_3AsO_4 + Fe_2(SO_4)_3 \rightarrow 2FeAsO_4 \downarrow + 3H_2SO_4 \quad (7)$$

It should be noted that the above equations (1) to (7) are one way only of representing the reactions that may be involved in the process of the invention. Other mechanisms have been proposed by various authors in the prior art which may be an equally valid way of describing the results observed. For the avoidance of doubt, it is hereby stated that it is not intended that the validity of the present invention should in any way be affected by the correctness or otherwise of the reaction mechanisms proposed herein.

In the leach stage the ore or concentrate undergoes chemical leaching due to the presence of the bacterially generated ferric ions in the acidic aqueous leaching medium. Such chemical leaching can be described, for example by equations (3) and (4) above. In addition some bacterial leaching may occur, if the acidic aqueous leaching medium contains active bacteria. A mechanism for such bacterial leaching is presented in equations (1) and (2) above. It is not, however, essential that the leaching medium contains active bacteria. Hence the leaching medium can contain impurities, such as arsenic, at levels which are sufficient to inhibit bacterial activity or even to kill all the bacteria supplied in the make-up stream from the generator.

The ore or concentrate supplied to the leach stage can be a gold-bearing arsenopyritic ore or concentrate. Although the exact mechanism is not entirely clear, it is believed that, in such a process according to the invention, arsenic is preferentially leached, thus liberating a high proportion of the entrapped gold for subsequent recovery by cyanide solution. In addition, the arsenic so solubilised can be made to react with ferric iron to produce insoluble ferric arsenate salt. This salt is widely accepted as being suitable for dumping and thus offers a safe mechanism for disposing of arsenic from arsenopyritic material.

The ferric iron concentration in the make-up stream depends upon a variety of factors, in particular upon the suitability of conditions in the generator for bacterial growth and the residence time of the bacterialaden solution in the generator. By suitable choice of such factors it is possible to achieve ferric iron concentrations in the make-up stream of about 15 grams per litre or higher, e.g. up to about 25 grams per litre. However, if the generator is to be of reasonable size, it will usually suffice to select conditions in the generator such that the ferric iron concentration in the make-up stream from the generator is in the range of from about 4 to about 10 grams per litre. By admixing this make-up stream with spent lixiviant recycled from the leach stage it is possible to reduce significantly the amount of liquor which would otherwise be required in the generator to produce all the ferric iron needed in the leach stage. Preferably the pH in the generator is at least about 0.8; normally the pH will lie in the range of from about 1.0 to about 3.0.

The pyritic material supplied to the generator desirably has a low content of arsenic and of other impurities which are potentially deleterious to bacterial growth. It should not, however, be pure pyrite.

Other factors which affect bacterial growth include temperature and the provision of adequate supplies of nutrients and oxygen. Low temperatures inhibit bacterial growth whilst excessively high temperatures may kill the bacteria. Generally speaking a temperature in the range of from about 15° C. to about 45° C. should be used in the generator.

The aqueous acidic leaching medium supplied to the leach stage may or may not contain active bacteria. Hence it is not crucial to the process of the invention whether or not active bacteria are present in the leach stage; leaching occurs whether they are present or not.

It is, however, essential to use in the process of the invention a leaching medium that contains bacterially generated ferric ions. Thus comparative tests have shown that the leaching action observed with inorganic ferric sulphate (chemical grade) is inferior to that obtained using bacterially generated ferric ions. These observations would tend to suggest that the bacterially generated ferric sulphate solution contains some hitherto undefined constituent that aids leaching. Although the exact reason for these observations is not known, it is possible that some bacterial excreta may be responsible, perhaps a glutathione component, that prevents deposition of elemental sulphur.

The aqueous leaching medium supplied to the leach stage comprises a mixture of recycled liquor and the make-up stream from the generator. If the ore or concentrate supplied to the leach stage contains arsenic or some other leachable impurity that is potentially deleterious to bacterial activity, then such impurities will appear in the recycled liquor. In the cyclic process of the prior art, it would be necessary to operate using a dilute circulating liquor with such ores or concentrates because it would be necessary to operate at impurity levels which the bacteria can tolerate. However, the use of a dilute circulating liquor means that correspondingly low concentrations of ferrous and ferric ions must be accepted, which in turn means that leaching is slower, residence times are longer in the leach stage, and the size of the leach tanks must be increased. In contrast, as the presence of active bacteria in the leach stage is not essential in the process of the invention, the recycled liquor can contain arsenic and/or other potentially deleterious impurities at levels which kill all bacteria supplied in the make-up stream or which halt or inhibit bacterial activity in the leach stage. Hence the liquor recycle loop can be operated at relatively high concentrations of ferrous and ferric ions with the corresponding benefits of enhanced leaching, lower residence times in the leach stage, and smaller leach tanks. Thus the process of the invention can be used with ores or concentrates, such as arsenopyrite, which were not previously amenable to bacterial leaching for economic or practical grounds.

A pyritic material is supplied to the generator and an ore or concentrate to the leach stage. The ratio in which these materials are required depends upon the chemical compositions of the materials. Sufficient pyritic material is supplied to the generator to give the desired ferric iron concentration in the make-up stream which is in turn supplied generally in sufficient volume to provide at least the stoichiometric quantity of ferric iron required in the leach stage. This stoichiometric quantity will in turn depend upon whether conditions in the leach stage enable bacterial leaching to occur and hence upon the nature of the ore or concentrate and the impurity level in the recycled liquor admixed with the make-up stream. Typically the weight ratio of the pyritic material to ore or concentrate is of the order of about 1:5 to about 1:20.

An important factor for successful operation of the process is the residence time of the ore or concentrate in the leach stage. It has been found that the optimum residence time varies from one material to another but that there is no direct correlation between the degree of iron or sulphur oxidation and subsequent gold recovery. Typically the residence time in the leach stage lies in the range of from about 24 hours to about 96 hours. Although the optimum residence time in the leach stage is best found by a process of trial and error, a typical residence time is about 72 hours when using a pulp containing 10% w/w solids.

In some cases it is possible to enhance gold recovery from a particular material by preparing a cleaner concentrate and cleaner tailings according to conventional flotation techniques. The cleaner concentrate is then used as pyritic material supplied to the generator, while the cleaner tailings are supplied as, or as part of, the ore or concentrate supplied to the leach stage.

In accordance with a particularly preferred feature of the invention there is provided a process for recovery of gold from a gold-bearing material selected from a gold-bearing ore and a gold-bearing concentrate which comprises:

(i) supplying a pyritic material, sulphuric acid, nutrients, and an oxygen-containing gas to a generator vessel containing a colony of *Thiobacillus ferro-oxidans*, thereby to generate an aqueous acidic ferric sulphate solution containing bacterially generated ferric ions;

(ii) admixing resulting aqueous acidic ferric sulphate solution with an aqueous recycle stream containing ferrous ions;

(iii) leaching the gold-bearing material in the form of a pulp in a leach stage by admixture with the mixed aqueous liquor from step (ii);

(iv) separating resultant leached solids from an aqueous leach liquor containing ferrous ions;

(v) subjecting recovered solids of step (iv) to a cyanide leach step;

(vi) discarding a part of the aqueous liquor of step (iv) in excess of the volume required to form the aqueous recycle stream of step (ii); and (vii) recycling the remainder of the aqueous liquor of step (iv) as the aqueous recycle stream of step (ii).

In order that the invention may be clearly understood and readily carried into effect, a preferred process according to the present invention, and a plant for carrying out such a process, will now be described, by way of example only, with reference to the accompanying diagrammatic drawing, which is a flow sheet of the plant.

It will be appreciated by those skilled in the art that, as the drawing is diagrammatic, many items of equipment which will be required in practice to construct a plant have been omitted from the drawing for the sake of clarity. Such items of equipment include, for example, pumps, mechanical stirrers, temperature controllers, air compressors, pH meters and control equipment required for efficient operation of the plant. The provision of such ancillary items of equipment will be in accordance with conventional chemical engineering practice and forms no part of the present invention.

Referring to the drawing, a pyritic gold-bearing ore or concentrate is supplied in suitable finely divided form as a 60% solids slurry as indicated by line 1 to a number of leach tanks 2 at a rate of 3000 kg/day. As shown in the drawing there are three leach tanks 2; however, the number of leach tanks used in practice will depend upon such factors as the desired leach time and the design throughput of the plant. Leach tanks 2 are also supplied by way of line 3 with 25 m³/day of an aqueous acidic leaching medium containing ferric ions. Stirring devices (not shown) are provided in each of leach tanks 2 so as to form a pulp of the particles of ore or concentrate in the aqueous acidic leaching medium. Typically the leach residence time in leach tanks 2 is approximately 72 hours when using a 10% w/w solids content pulp. In addition to mechanical agitation provided by the stirrers (not shown) air sparging is preferably used, the air being supplied by way of line 4 to each leach tank 2.

Pulp is withdrawn from leach tanks 2 and is led in line 5 to a filter press feed tank 6 from which it is pumped by way of line 7 to a filter press 8. The solids (S) from filter press 8 are fed in the form of an approximately 80% w/w slurry by way of line 9 to a repulping tank 10. Repulping tank 10 is provided with a suitable stirrer (not shown) for agitating the contents of the tank and admixing same with a slurry of calcium hydroxide supplied in line 11 for the purpose of pH adjustment. About 1.5 kg/day of calcium hydroxide is required for this purpose. The resulting slurry is fed by line 12 to a conventional cyanide leach plant 13 for extraction of gold.

The aqueous liquor (L) from filter press 8 contains ferrous ions and some ferric ions and is recovered in line 14. Part of this liquor is purged from the plant in line 15 for disposal. The remainder of the aqueous liquor, amounting to 13.125 m³/day, is recycled in line 16 to a converter vessel 17 which is supplied with make-up water in line 18 and with 11.875 m³/day of a bacterially generated acidic ferric sulphate solution in line 19. This bacterially generated acidic ferric sulphate solution is produced in a bacterial generator tank 20 which contains a colony of *Thiobacillus ferro-oxidans*. This bacterial generator tank 20 is external to the liquid recycle loop formed by leach tanks 2, filter press feed tank 6, filter press 8 and converter vessel 17 and their connecting lines 3, 5, 7, 14 and 16. It is supplied with 300 to 625 kg/day of a pyritic substrate as indicated by line 21, with an aqueous nutrient medium, such as 9K Nutrient in line 22, and with sulphuric acid in line 23. The contents of generator tank 20 are stirred by means of a stirrer (not shown) and the contents are sparged with air supplied in line 24. A cooling coil may be provided in bacterial generator 20 for temperature control so as to avoid overheating the bacteria and killing them. Preferably the temperature is maintained in the range of from about 15° C. to about 45° C., preferably about 30° C. to about 35° C. Addition of sulphuric acid is controlled by means of a pH meter (not shown) which monitors the acid concentration in generator 20. The pH is preferably maintained above about 0.8.

If a gold-bearing material is supplied in line 21 to generator tank 20 pulp may be withdrawn in line 25 and passed in line 26 to filter press feed tank 6 for subsequent recovery of gold in plant 13. If a non-gold bearing material is supplied in line 21 then lines 25 and 27 may be used to purge solids from the generator tank 20.

The material supplied in line 1 may be an arsenopyritic concentrate or ore. However, the pyritic material supplied in line 21 should have a low arsenic concentration; it should not, however, be pure pyrite. The material supplied in line 21 can be an ore or a concentrate, but it must be free from organic reagents such as flotation agents.

Under suitable conditions the ferric ion concentration of the liquor in line 19 may contain typically 10 g/liter ferric iron.

The invention is further illustrated in the following Examples.

EXAMPLES

The results of seven tests carried out in a pilot plant constructed according to the drawing are summarised below in the Table. In this Table the abbreviations have the following meanings:
1. RSA Republic of South Africa
2. REGM Randfontein Estates Gold Mine
3. WAGM Western Area Gold Mine Example 1 is a comparative example.

Example 2 shows the marked improvement in gold extraction achieved by effecting a conventional cyanide leach following bacterial treatment in the pilot plant of the drawing, the percentage gold recovery rising from 50.0% achieved by conventional cyanide leach only (see Example 1) to 94.4% (see Example 2).

In Example 5 the bacterial leach step was replaced by a leach using inorganic ferric sulphate in place of the bacterially generated ferric sulphate.

The Centurion flotation concentrate contains 4 to 8% of arsenic; hence when this concentrate is used as the pyritic substrate supplied in line 21, the bacterial leaching effect is relatively poor (see Examples 6 and 7).

3. A process according to calim 1, in which the oxygen-containing gas is air.

4. A process according to claim 1, in which the leach stage is operated using a pulp of the gold-bearing material containing from about 5% to about 15% w/w solids and the residence time of the solids in the leach stage is from about 24 hours to about 96 hours.

5. A process according to claim 4, in which the pulp has a solids content of about 10% w/w solids and in which the residence time of the solids in the leach stage

TABLE

| Example No. | Sample Description | Leach Time (Days) | Pulp Density (% w/w) | Ferric Tenor Ex Generator (g/liter) | Generator Substrate | Gold Extraction By Cyanide Leach (% of Head) |
|---|---|---|---|---|---|---|
| 1 | Flotation Concentrate from Centurion Mine, RSA. Conventional Cyanide Leach only | — | — | — | — | 50.0 |
| 2 | As above following bacterial leach as described | 3.0 | 10.0 | 10.0 | Concentrate produced from REGm | 94.4 |
| 3 | As for 2 above | 3.0 | 10.0 | 10.0 | Concentrate produced from WAGM (RSA) uranium plant tailings | 74.8 |
| 4 | As for 2 above | 3.0 | 10.0 | 10.0 | Cleaner Concentrate produced from Centurion flotation concentrate | 91.0 |
| 5 | As for 2 above | 3.0 | 10.0 | 10.0 | Inorganic ferric sulphate (chemical grade) only | 62.6 |
| 6 | As for 2 above | 3.0 | 10.0 | 6.4 | Centurion flotation concentrate | 60.7 |
| 7 | As for 2 above | 3.0 | 10.0 | 10.5 | Centurion flotation concentrate | 68.2 |

We claim:

1. A process for recovery of gold from a gold-bearing arsenopyritic material selected from a gold-bearing arsenopyritic ore and a gold-bearing arsenopyritic concentrate in which an aqueous liquor is circulated between a leach stage and a solids separation stage, which process comprises:
    (i) supplying a pyritic material, sulphuric acid, nutrients, and an oxygen-containing gas to a generator vessel containing a colony of *Thiobacillus ferro-oxidans*, said pyritic material having a content of arsenic producing an arsenic content in the liquor in the generator vessel which is less than the arsenic content of a recycle stream leaching the gold-bearing arsenopyritic material, thereby to generate an aqueous acidic ferric sulphate solution containing bacterially generated ferric ions;
    (ii) admixing resulting aqueous acidic ferric sulphate solution with an arsenic-containing aqueous recycle stream containing ferrous ions;
    (iii) leaching the gold-bearing arsenopyritic material in the form of a pulp in the leach stage by admixture with the feric sulphate and arsenic-containing aqueous liquor from step (ii);
    (iv) separating resultant leached solids in the solids separation stage from the arsenic-containing aqueous leach liquor containing ferrous ions;
    (v) subjecting recovered solids of step (iv) to a cyanide leach step;
    (vi) discarding a part of the arsenic-containing leach liquor of step (iv) in excess of the volume required to form the arsenic-containing aqueous stream of step (ii); and
    (vii) recycling the remainder of the arsenic-containing aqueous leach liquor of step (iv) as the arsenic-containing aqueous recycle stream of step (ii).

2. A process according to claim 1, in which the pH in the generator is controlled in the range of from about 8 to about 3.0.

is about 72 hours.

6. A process for the recovery of gold from a gold-bearing arsenic-containing material selected from an arsenopyritic ore and an arsenopyritic concentrate in which an aqueous liquor is circulated between a leach stage and a solids separation state, which process comprises:
    (i) supplying to a generator vessel which is external to the path of the liquor circulating between the leach stage and solids separation stage and which contains a colony of *Thiobacillus ferro-oxidans*, a pyritic material that has a content of arsenic producing an arsenic content in the generator vessel which is less than the arsenic content of a recycle stream leaching the gold-bearing arsenopyritic material, as well as sulphuric acid, nutrients, and an oxygen-containing gas thereby to generate an auqeous acidic ferric sulphate solution containing bacterially generated ferric ions and having a pH in the range of from about 0.8 to about 3.0;
    (ii) admixing resulting aqueous ferric sulphate solution with an aqueous recycle stream containing ferric ions and dissolved arsenic values;
    (iii) leaching the gold-bearing asenopyritic material in a leach stage in the form of a pulp containing from about 5% to about 15% w/w solids by admixture with the mixed ferric sulphate and arsenic-containing aqueous liquor from step (ii);
    (iv) separating resultant leached solids from an aqueous leach liquor containing ferrous ions and dissolved arsenic values;
    (v) subjecting recovered solids of step (iv) to a cyanide leach step;
    (vi) discarding a part of the aqueous leach liquor of step (iv) in excess of the volume required to form the aqueous recycle stream of step (ii); and
    (vii) recycling the remainder of the aqueous leach liquor of step (iv) along a path which does not include the generator vessel to form the aqueous recycle stream of step (ii).

7. A process according to claim 6, in which the pH in the generator is controlled in the range of from about 0.8 to about 3.0.

8. A process according to claim 6, in which the leach stage is operated using a pulp of the gold-bearing material containing from about 5% to about 15% w/w solids and the residence time of the solids in the leach stage is from about 24 hours o about 96 hours.

9. A process according to claim 8, in which the pulp has a solids content of about 10% w/w solids and in which the residence time of the solids in the leach stage is about 72 hours.

* * * * *